O. H. L. WERNICKE.
LUBRICATING DEVICE.
APPLICATION FILED FEB. 12, 1912.
1,037,383.
Patented Sept. 3, 1912.
2 SHEETS—SHEET 1.
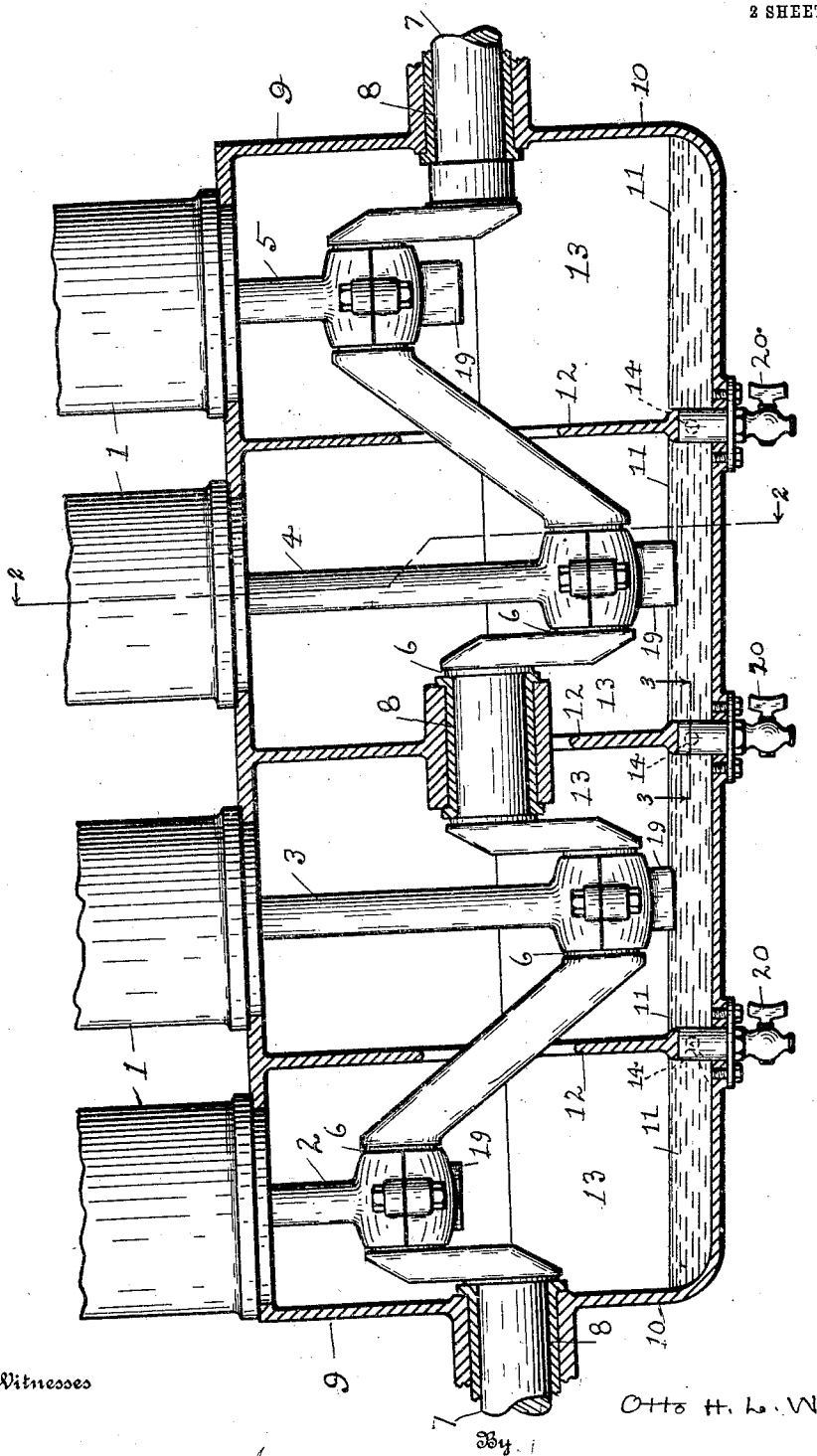

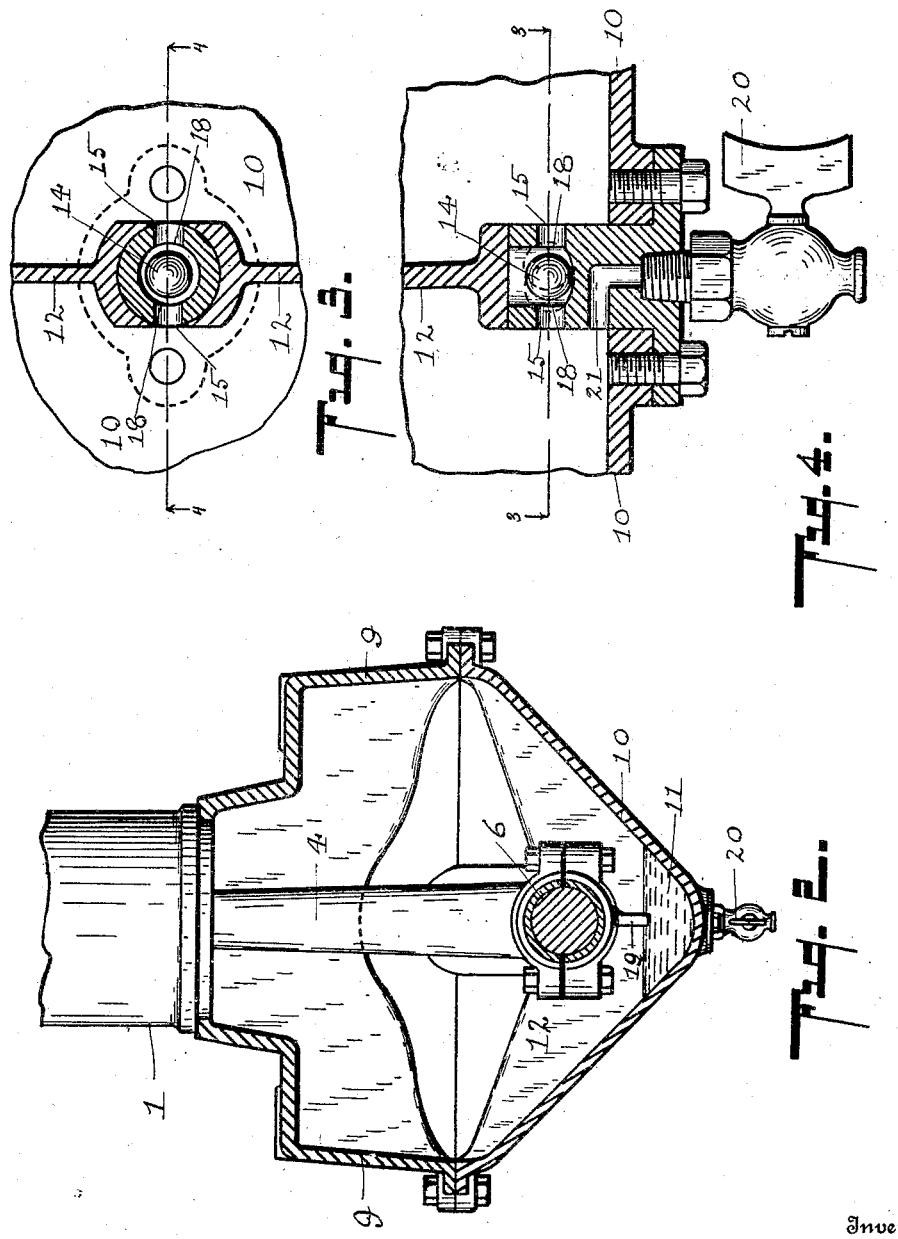

UNITED STATES PATENT OFFICE.

OTTO H. L. WERNICKE, OF GRAND RAPIDS, MICHIGAN.

LUBRICATING DEVICE.

1,037,383.  Specification of Letters Patent.  Patented Sept. 3, 1912.

Application filed February 12, 1912. Serial No. 677,067.

*To all whom it may concern:*

Be it known that I, OTTO H. L. WERNICKE, a citizen of the United States, residing at Grand Rapids, in the county of Kent and State of Michigan, have invented new and useful Improvements in Lubricating Devices, of which the following is a specification.

My present invention relates to lubricating devices for crank shafts, and its object is to provide an improved device of that character for the lubrication of shafts which have a plurality of cranks and are subjected to change of position in the shaft's axial plane while in motion, as are the engine shafts of automobiles; and especially such shafts as are axially inclined from the horizontal. This object is attained by, and my invention finds a preferable embodiment in, the structure hereinafter described, illustrated by the accompanying drawings, in which—

Figure 1 is a vertical section of a structure embodying my invention, taken on the line of the axis of the shaft; Fig. 2 is a transverse section thereof on a line corresponding to line 2—2 of Fig. 1; Fig. 3 is a horizontal section (enlarged) of one of the valves taken on line 3—3 of Fig. 1 and corresponding to line 3—3 of Fig. 4, and Fig. 4 is a vertical section taken on line 4—4 of Fig. 3.

The drawings exhibit my invention as applied to an automobile having a common form engine whose four cylinders (their upper portions broken away) are indicated at 1, and having pistons 2, 3, 4 and 5, operating respectively on the crank-pins 6 of the engine shaft 7, which has bearings 8 on a suitable crank-shaft casing 9, whose lower portion 10 contains lubricating oil indicated at 11. Suitable partitions 12 form separate oil-cellars 13 (four in the construction shown), being one oil-cellar for the crank of each engine cylinder. A suitable valve, as the ball-valve 14, controls an oil passage 15 through each partition 12, and is arranged to permit the opening of such passage when the machine is in level position (*i. e.,* when the automobile is on level ground), and to automatically close such passage when the machine is inclined, in the axial direction of the shaft, from the horizontal (*i. e.,* when the automobile is traveling up or down hill). This closing operation of each valve 14 is effected by gravity acting on the valve ball which rolls and seats itself at the lower one of its two seats 18 when the automobile is going up or down grade, thus closing the passage. The vibration resulting from the running of the motor or the jolting of the moving machine unseats the valve when the machine is in level position, thus opening the passage. It will be seen that by this construction and arrangement the oil is prevented from flowing away from any crank,—that is, out of any oil-cellar 13—and that any difference which may exist in level of the oil in the several oil-cellars is rectified when the automobile is on level ground. It will be seen also, that, even, though no valve 14 is employed, the passage 15, if not too large, will retard the flow of oil when the vehicle is going up or down grade, and will also permit the oil to attain the same level in all the cellars when the road is level.

Though the crank-shaft is axially inclined from the horizontal, as the automobile crank-shaft shown, the oil in the oil-cellar in my device is nevertheless approximately level; and the oil-splashers 19 (which strike the oil and splash it on the running parts) for the cranks toward the higher end of the crank-shaft are longer than such splashers for the cranks toward the lower end of the shaft, in order that their immersion in the oil of the cellar or several cellars may be uniform. Suitable cocks 20 controlling draining passages 21 from the oil-cellars may be provided as shown.

Not confining myself to the details of construction and arrangement shown and described, I claim—

1. In a device of the character described; a crank-shaft axially inclined from the horizontal and having a plurality of cranks; an oil-cellar below said crank shaft adapted to contain suitable fluid lubricant for the cranks; and splashers carried one in connection with each crank and being so graduated as to length that the splashers for the respective cranks when in motion contact at a suitable depth with the lubricant.

2. In a device of the character described; a crank-shaft axially inclined from the horizontal and having a plurality of cranks; a plurality of oil-cellars below said crank shaft adapted to contain suitable fluid lubricant for the cranks; and splashers carried one in connection with each crank and being so graduated as to length that the splashers for the respective cranks when in motion contact at a suitable depth with the lubricant.

3. In a device of the character described; a crank-shaft axially inclined from the horizontal and having a plurality of cranks; a plurality of oil-cellars, one for each crank, below the shaft, adapted to contain suitable fluid lubricant for the cranks, and having a contracted inter-communicating passage whereby the lubricant in the several cellars may attain the same level; and splashers carried one in connection with each crank and being so graduated as to length that the splashers for the respective cranks when in motion contact at a suitable depth with the lubricant.

4. In a device of the character described; a crank-shaft axially inclined from the horizontal and having a plurality of cranks; a plurality of oil-cellars, one for each crank, below the shaft, adapted to contain suitable fluid lubricant for the cranks; and having an inter-communicating passage whereby the lubricant in the several cellars may attain the same level; a gravity-operated valve controlling said passage and splashers carried one in connection with each crank and being so graduated as to length that the splashers for the respective cranks when in motion contact at a suitable depth with the lubricant.

5. In a device of the character described, a crank-shaft axially inclined from the horizontal and having a plurality of cranks; a plurality of oil-cellars, one for each crank, below the shaft, adapted to contain suitable fluid lubricant for the cranks; and having an inter-communicating passage whereby the lubricant in the several cellars may attain the same level; a valve controlling said passage and splashers carried one in connection with each crank and being so graduated as to length that the splashers for the respective cranks when in motion contact at a suitable depth with the lubricant.

6. In a device of the character described, a crank-shaft having a plurality of cranks; and a plurality of oil-cellars, one for each crank, below the shaft, adapted to contain suitable fluid lubricant for the cranks, and having an inter-communicating passage whereby the lubricant in the several cellars may attain the same level; and a gravity-operated valve controlling said passage.

7. In a device of the character described, a crank-shaft having a plurality of cranks; and a plurality of oil-cellars, one for each crank, below the shaft, adapted to contain suitable fluid lubricant for the cranks, and having an inter-communicating passage whereby the lubricant in the several cellars may attain the same level; and a valve controlling said passage.

In testimony whereof I have hereunto set my hand in presence of two subscribing witnesses

OTTO H. L. WERNICKE.

Witnesses:
 MARY S. TOOKER,
 MARY SCHULTE.